(12) United States Patent
Lee et al.

(10) Patent No.: US 6,191,193 B1
(45) Date of Patent: Feb. 20, 2001

(54) MICROSPHERIC EMBOLIC MATERIALS HAVING A DUAL STRUCTURE OF POLY (VINYL ACETATE) CORE AND POLY(VINYL ALCOHOL) SHELL AND METHOD FOR PREPARING THE SAME

(75) Inventors: Chul-Joo Lee, Seoul; Won-Seok Lyoo, Kyonggido; Ick-Chan Kwon, Seoul; Se-Geun Lee, Inchonshi; Jae-Pil Kim; Moon-Hee Han, both of Seoul, all of (KR)

(73) Assignee: Korea Institute of Science & Technology, Seoul (KR)

( * ) Notice: Under 35 U.S.C. 154(b), the term of this patent shall be extended for 0 days.

(21) Appl. No.: 09/627,403

(22) Filed: Jul. 27, 2000

(30) Foreign Application Priority Data

Jan. 6, 2000 (KR) .................................................. 2000-385

(51) Int. Cl.[7] .................................................. C08F 118/08
(52) U.S. Cl. .............................. 523/201; 521/54; 521/56; 525/56; 525/62; 525/902; 526/319; 526/330; 526/909
(58) Field of Search .............................. 523/201; 521/54; 525/56, 62, 902; 526/319, 330, 909

(56) References Cited

U.S. PATENT DOCUMENTS 4,169,828 * 10/1979 Wright .................................. 526/909
5,578,689 * 11/1996 Nogues et al. ...................... 526/909
5,625,021 * 4/1997 Parusel et al. ...................... 526/909

OTHER PUBLICATIONS

C. J. Lee, et al. "Novel Poly(vinyl akcohol) Embolic Microspheres", International Conference on Science and Technologies of Advanced Polymers ICAP 99–Yamagata, Jul. 26–30, 1999, p. 36–37.

* cited by examiner

*Primary Examiner*—Morton Foelak
(74) *Attorney, Agent, or Firm*—Oblon, Spivak, McClelland, Maier & Neustadt, P.C.

(57) ABSTRACT

A method for separating poly(vinyl acetate) particles having various particle sizes, which have been prepared by suspension polymerization of vinyl acetate monomers, into respective microspheric poly(vinyl acetate) particles with uniform particle size distribution by the use of inorganic salt as a dispersing and antistatic agent, a method for preparing the microspheric embolic particles of a dual structure consisting of poly(vinyl acetate) core/poly(vinyl alcohol) shell by suspending the separated poly(vinyl acetate) particles into an aqueous alkali solution and subjecting the suspended particles to a heterogeneous surface saponification and the microspheric embolic particles prepared.

5 Claims, 3 Drawing Sheets

MICROSPHERIC EMBOLIC MATERIALS HAVING A DUAL STRUCTURE OF POLY (VINYL ACETATE) CORE AND POLY(VINYL ALCOHOL) SHELL AND METHOD FOR PREPARING THE SAME

BACKGROUND OF THE INVENTION

1. Field of the Invention

The present invention relates to a method for separating poly(vinyl acetate) microspheric particles, and to the microspheric embolic particles of a dual structure consisting of poly(vinyl acetate) core (PVAc core) and poly(vinyl alcohol) shell (PVA shell), which is prepared from said separated Poly(vinyl acetate) particles. More particularly, the invention relates to a method for separating poly(vinyl acetate) particles having various particle sizes, which have been prepared by suspension polymerization of vinyl acetate monomers, into individual microspheric poly(vinyl acetate) particles with uniform particle size distribution by the use of inorganic salt as a dispersing and antistatic agent, to a method for preparing the microspheric embolic particles of a dual structure consisting of PVAc core and PVA shell by suspending the separated poly(vinyl acetate) particles into an aqueous alkali solution and subjecting the suspended particles to a heterogeneous surface saponification, and to the microspheric embolic particles thus prepared.

2. Description of the Prior Art

Embolotherapy is a medical treatment technology that blocks the blood flow in blood vessels which supply blood for lesions of surgically untreatable sites by injecting a special material into said blood vessels, and thereby treats the lesions, relieves symptoms due to excessive blood flow and prevents hemorrhaging during surgical operations. Said special material is referred to as "embolic material." Poly (vinyl alcohol) (PVA) is currently used in commerce as embolic materials. Embolotherapy is used as a means of treatment for hypervascular tumors with high vascularity, vascular diseases such as arteriovenous malformation (AVM), and traumatic or inflammatory hemorrhaging, such as with tuberculosis.

J. Markowitz first established the concept of treating diseases by embolotherapy in 1952. He suggested a treatment method for hepatic tumors by blocking arterial blood flow, based on the fact that the liver is supplied with blood via both hepatic portal vein and hepatic artery, while the primary and metastatic hepatic tumor cells mainly via hepatic artery (See J. Markowitz, Surg. Bynecol. Obstet., 395, 644, 1952).

For selective embolization, it is necessary to know whether the hepatic tumor cells are supplied with blood via hepatic portal vein or hepatic artery. Hearley and Sheena have ascertained by means of injecting dyes and radioactive material that hepatic tumor cells are supplied with blood solely from the hepatic artery (See J. E. Hearley and K. S. Sheena, et al., S Surg. Forum, 14, 121, 1963). Further, Gelin et al. have showed that after removing the hepatic artery, the blood flow in the malignant tumors decreased by 90%, whereas the blood flow in normal tissues decreased only by 35–40% (See L. E. Gelin, D. H. Lewis and L. Nilsson, Acta Hepatosplenol, 15, 21, 1968).

Embolotherapy is used in the treatment of AVM addition to liver cancer. There is a report showing that embolotherapy to the cerebral AVM resulted in an increase in the survival rate (See L. A. Nisson and L. Zettergen, Acta Pathol. Microbiol. Scand., 71, 187, 1967).

Further, recent studies have shown that in addition to said lesions, uterine arterial embolotherapy is effective for the treatment of hemorrhaging and pelvic pains (See S. C. Goodwin, S. Vedantham, B. Mclucas, A. E. Fomo and R. Perrella, J. Vascular and Interventional Radiology, 8(4), 517, 1997). There is also a report showing that embolotherapy can be used to prevent excessive hemorrhaging during surgical operations, to shorten the required time for surgery and to reduce risks in an operation by pre-operatively occluding blood vessels around injuries (See T. Tikkakoski, J. Luotonen, S. Leinonen, T. Siniluoto, O. Heikkila, M. Paivansalo and K. Hyrynkangas, LARYNGOSCOPE 107 (6), 821, 1997).

There are a variety of materials that are used as embolic materials, including metallic fibrous coils, liquid tissue adhesives, that is in liquid forms upon operation, but after administration is hardened to occlude blood vessels, barium impregnated silastic balls, methacrylates, collagen-coated acrylic microspheres and PVA. Since the 1970s, especially the PVA in the form of particulates and hydrogel has been widely used as an embolic material.

An ideal embolic material should be made of a substance that exhibits excellent biocompatibility due to the interaction with tissues surrounding the site to be treated; be standardized in the physical sizes and the distribution of particles sizes so as to effectively get to the target site of lesions in order to achieve an excellent therapeutic effect and to predict therapeutic effects; be smooth on the surface so as not to induce secondary lesions such as inflammation in the occluded blood vessels; be easily handled and injected for general clinical use; exhibit permanent embolic effects without reperfusion of the blood; and have X-ray radiopacity or form homogeneous suspension in a nonionic vehicle for correct evaluation of the occlusions of the blood vessels upon and after the operation.

Poly(vinyl alcohol) (PVA), which was first prepared by Herrmann and Haehnel of Germany in 1924 (See W. O. Herrmann and W. Haehnel, German Patent 450,286, 1924), is a linear, crystalline, hydroxy group-containing polymer prepared by saponification of vinylester-based polymers such as poly(vinyl acetate). PVA has been singled out from among a variety of embolic materials because of its biocompatibility, technical ease and because its particle size can be variously adjusted. Considering the above-mentioned requirements, it can be easily understood that among others, PVA in a microspheric shape with uniform dimension distribution is most ideal for embolic materials.

At present, PVA is used as an embolic material for malignant hepatic tumors, hepatic AVM, cerebral AVM, vascular tumors in many sites, etc., and is the most widely used among currently existing embolic materials. Accordingly, a lot of studies on poly(vinyl alcohol) are in progress.

However, the use of poly(vinyl alcohol) in existing studies and in clinics has been reported to cause side effects such as inflammation of the embolized blood vessel. This inflammation is thought to be caused by the sharp-edged portions of the materials used. Moreover, with respect to the size of embolic particles, neonates have been reported to die after their AVMs have been treated with commercial embolic poly(vinyl alcohol). The results of a study on the uniformity of the particle sizes of commercial embolic poly(vinyl alcohol) particles illustrate that the death of neonates is related to the non-uniformity of the particle sizes (See I. Repa, et al., Radiology, 170, 395, 1989).

Although the commercial poly(vinyl alcohol) products that are currently being widely used as embolic materials, such as Contour (registered trademark), Embosphere (registered trademark), Ultra Drivalon (registered trademark), etc., have been found to have a very low uniformity of particle sizes. Although high quality commercial products have been said to have size distribution ranges of 50–150 µm, 150–250 µm, 250–350 µm and 350–550 µm, it is reported that they, in fact, have a non-uniform physical size distribution, such as a particle size of from 1 µm to 1400 µm or larger.

Furthermore, as can be seen from the scanned electron micrograph that is shown in FIG. 1, the commercial poly (vinyl alcohol) embolic material "Contour" is very rough, has sharp surfaces and, therefore, is very different from spherical particles having a uniform dimension distribution.

Many researchers have recently made attempts to prepare spherical particles from various polymers other than poly (vinyl alcohol), such as porous cellulose, gelatin, collagen and collagen-coated acrylate, in order to develop ideal microspheric embolic materials. However, it is impossible to control the chemical dimensions (e.g. molecular weight, molecular weight distribution and branching degree) and physical dimensions (particle size and shape) of natural occurring polymeric materials such as gelatin, because these materials are obtained directly from nature. Additionally, it is difficult to make spherical particles of variable sizes into a uniform size distribution with a view to operating. Also, their permanent embolic effects have not yet been confirmed.

Consequently, established studies on embolic materials have found that poly(vinyl alcohol) is the most effective. However, there is no report that shows the preparation of microspheric particles with a uniform size distribution by means of controlling the synthesis conditions of poly(vinyl alcohol) itself (e.g., polymerization condition of precursors) or molecular variables (e.g., molecular weight, saponification degree, branching degree, stereoregularity, etc.).

Also, although the polymeric particles prepared by suspension polymerization are generally retained in spherical forms, their sizes are very different depending on the condition of polymerization. Further, it is very difficult to separate them into individual, uniform-sized particles because they associate due to static attractive forces between the suspending agents used during polymerizing and the particles. The same problems occur when poly(vinyl acetate) is prepared by means of suspension polymerization of vinyl acetate. Thus, when it is converted to PVA by the saponification, the PVAc particles are retained in spherical forms but their sizes are non-uniform, and thereby the particles are inevitably associated. Therefore, it is necessary to separate the precursor spherical poly(vinyl acetate) in order to prepare PVA particles as excellent embolic materials with high quality.

Generally, the saponification of the poly(vinyl acetate) for the preparation of poly(vinyl alcohol) is achieved by completely dissolving poly(vinyl acetate) in methanol and then dropping the alkali solution. The poly(vinyl alcohol) prepared as such has very irregular surface and very wide size distribution.

Recently, the poly(vinyl acetate) has been sometimes used as embolic particles (See Y. Uchiyamatsuyuki, K. Kawashima, H. Araki and S. Otomo, Pharmacology Biochem, Behavior, 52(3), 555, 1995), but it is not accepted in terms of its biosynthesis and is not widely used clinically Thus, to produce the embolic particles with excellent embolic ability, a new saponification method that can prohibit the association of particles with maintaining the shape of particle is needed.

The present inventors have intensively investigated methods for separating the poly(vinyl acetate) particles which have been prepared by means of suspension polymerization, and methods for producing the poly(vinyl alcohol) embolic materials by the saponification of the poly(vinyl acetate). We have found that poly(vinyl acetate) particles having various particle sizes, which have been prepared by suspension polymerization of vinyl acetate monomers, can be separated into respective poly(vinyl acetate) particles with uniform particle size distribution by the use of inorganic salt as a dispersing and antistatic agent, and that the resulting separated poly(vinyl acetate) particles can be saponified solely on the surface thereof, with the microspheric forms thereof maintained, by suspending the particles in an aqueous alkali solution and subjecting the suspended particles to a heterogeneous surface saponification, thereby the novel microspheric embolic particles of a dual structure consisting of poly(vinyl acetate) core/poly(vinyl alcohol) shell can be prepared.

SUMMARY OF THE INVENTION

Figure 1:
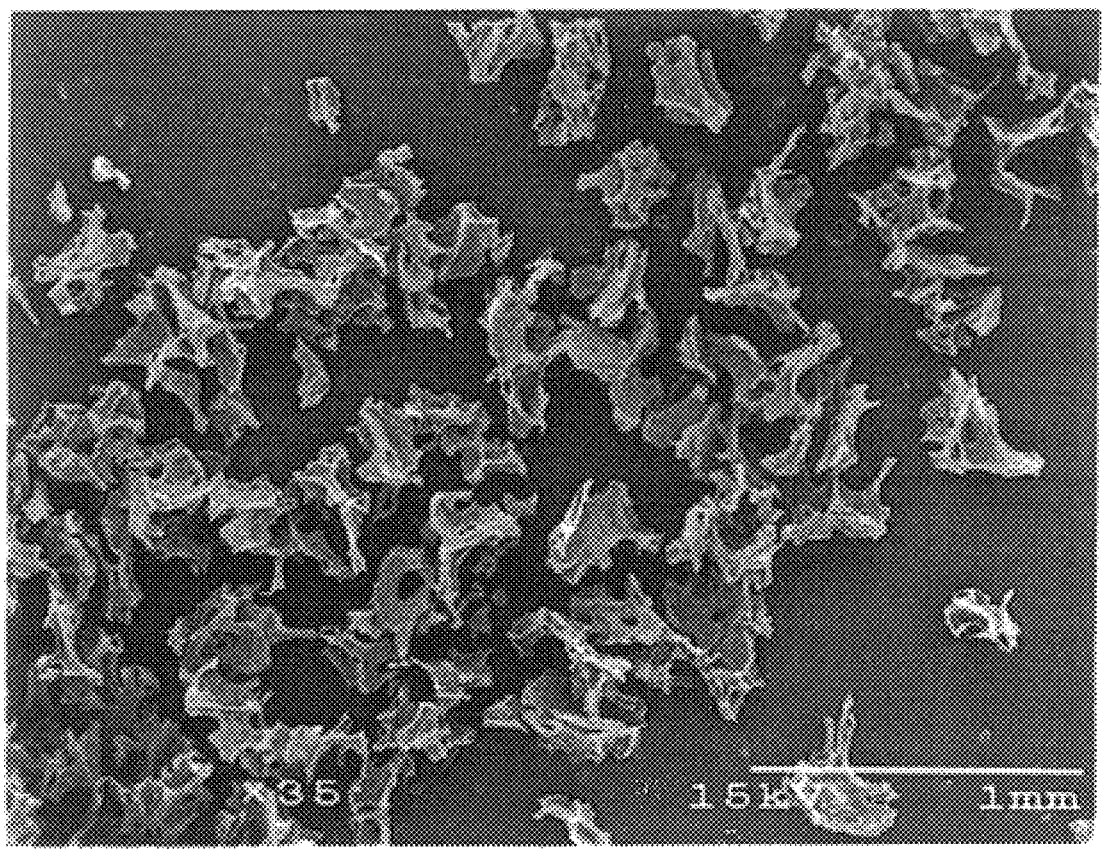
FIG. 1 is a scanned electron micrograph of commercial poly(vinyl alcohol)(PVA) embolic material, Contour (trade name).

It is an object of the invention to provide a method of separating poly(vinyl acetate) particles having various particle sizes, which have been prepared by suspension polymerization of vinyl acetate monomers, into respective poly (vinyl acetate) particles with uniform particle size distribution.

It is another object of the invention to provide the microspheric embolic materials of a dual structure consisting of poly(vinyl acetate) core/poly(vinyl alcohol) shell.

It is a further object of the invention to provide a method of preparing the microspheric embolic materials of a dual structure consisting of poly(vinyl acetate) core/poly(vinyl alcohol) shell.

The other objects and advantages of the invention will be apparent from the following detailed description of the invention.

DETAILED DESCRIPTION OF THE INVENTION

Hereinafter, the present invention will be described in detail.

Firstly, in accordance with the invention, a method for separating poly(vinyl acetate) particles having various particle sizes, which have been prepared by suspension polymerization of vinyl acetate monomers, into individual microspheric poly(vinyl acetate) particles having a uniform particle size distribution and a polydispersity index of partilce sizes of about 1.00–1.60, which comprises the steps of:

adding to said poly(vinyl acetate) partilces having various particle sizes inorganic salt as a dispersing and antistatic agent in the amount of about 0.1–100 parts by weight per part by weight of associates of said poly (vinyl acetate) particles having various particle sizes;

milling said associates of poly(vinyl acetate) particles; and separating said milled associates of poly(vinyl acetate) particles with standard sieves to individual particles having select particle sizes of 50–70 μm, 70–90 μm, 90–100 μm, 100–120 μm, 120–150 μm, 150–180 μm, 180–200 μm, 200–220 μm, 220–250 μm, 250–300 μm, 300–350 μm, 350–400 μm, 400–450 μm, 450–500 μm, 500–600 μm, 600–700 μm, 700–800 μm, 800–900 μm and 900–1,000 μm.

The inorganic salts useful in the separation method of the microspheric poly(vinyl acetate) particles according to the invention are sodium sulfate, sodium sulfite, sodium chloride, calcium sulfate or magnesium sulfate. They are used in the amount of 0.1–100 parts by weight per part by weight of poly(vinyl acetate) particles.

The associates of poly(vinyl acetate) particles are then milled so as to regulate their particle size and are separated with standard sieves into individual particles having select particle sizes of 50–70 μm, 70–90 μm, 90–100 μm, 100–120 μm, 120–150 μm, 150–180 μm, 180–200 μm, 200–220 μm, 220–250 μm, 250–300 μm, 300–350 μm, 350–400 μm, 400–450 μm, 450–500 μm, 500–600 μm, 600–700 μm, 700–800 μm, 800–900 μm and 900–1,000 μm. Thus, the separated poly(vinyl acetate) particles have a uniform distribution with a polydispersity index of about 1.00–1.60.

In accordance with the invention, the addition of the inorganic salt as a dispersing and antistatic agent during the milling of the poly(vinyl acetate) particles having various particle sizes, which have been prepared by suspension polymerization, separates the individual particles and removes the electrostatics between the particles, imparting an expedience to the subsequent process.

Further, according to the invention, using the poly(vinyl acetate) particles having uniform distribution of particle sizes with a polydispersity index of about 1.00–1.60, which have been separated by the inventive method, it is possible to provide the microspheric embolic materials of a dual structure consisting of PVAc core and PVA shell with the diameter ratio of the outer PVA shell and of the inner PVAc core of 0.01–0.99, having select particle sizes of 50–70 μm, 70–90 μm, 90–100 μm, 100–120 μm, 120–150 μm, 150–180 μm, 180–200 μm, 200–220 μm, 220–250 μm, 250–300 μm, 300–350 μm, 350–400 μm, 400–450 μm, 450–500 μm, 500–600 μm, 600–700 μm, 700–800 μm, 800–900 μm and 900–1,000 μm, having a polydispersity index of about 1.001–1.200, and having the saponification degree of the poly(vinyl acetate) of 1–99.9% by heterogeneous surface saponification.

Said embolic materials having a dual structure of PVAc core and PVA shell of the invention are prepared by suspending the poly(vinyl acetate) particles having a uniform distribution of particle sizes and a polydispersity index of about 1.00–1.60, which have been separated by the inventive method, into an aqueous alkali solution and subjecting them to a heterogeneous surface saponification at a temperature of 0° C. to 90° C. so that only the surface of the poly(vinyl acetate) particles can be saponified.

In accordance with the invention, aqueous alkali solutions used in preparing embolic materials having a dual structure of PVAc core and PVA shell, include aqueous solutions comprising sodium chloride, sodium sulfate or sodium sulfite and methanol. It is preferable to use aqueous solutions comprising sodium chloride in the amount of 0.1 to 100 parts by weight or sodium sulfate or sodium sulfite in the amount of 0.1 to 100 parts by weight and methanol in the amount of 0.1 to 100 parts by weight per 1 part by weight of the separated poly(vinyl acetate) particles dissolved in 10 to 100 parts by weight of water.

The heterogeneous surface saponification reactions of the poly(vinyl acetate) particles occur at a temperature of 0° C. to 90° C. in said aqueous alkali solutions, resulting in embolic particular materials having a dual structure of PVAc core and PVA shell.

The novel method for preparing the embolic particular materials having a dual structure of PVAc core and PVA shell, which have uniform size distribution and particle size available for embolotherapy is characterized by the followings.

First, in the polymeric particles prepared by the conventional suspending polymerization, the associations occur because of the electrostatic between the suspending stabilizing agents and the particles. Thus, although the associated particles are separated by milling, the particles are re-associated as a result of the electrostatic between the particles. Therefore, it is very difficult to separate the particles to a uniform size. Particularly, the electrostatic between the particles makes the delicate processes difficult by causing many problems, such as adhesion of the particles on the reactor wall. In the present invention, however, it is possible to carry out the separation of the particles by incorporating inorganic salt as a dispersing and antistatic agent during milling, thereby making the subsequent processes easier.

Second, in the conventional saponification processes, the conversion of the poly(vinyl acetate) into poly(vinyl alcohol) is carried out by dissolving poly(vinyl acetate) into methanol and using the high-level aqueous alkali solutions as a catalyst. The poly(vinyl alcohol) particles prepared as such, however, have irregular sizes and rough surfaces, thereby upon using as embolic materials, rendering the high selectivity occlusions of the blood vessels unable and causing inflammations on the vascular wall. To resolve such problems, the present invention suspends the poly(vinyl acetate) particles which have been prepared by suspension polymerization into an aqueous alkali solution so as to induce the surface saponification, thereby maintaining a complete spherical shape and smooth surface of the particles. Also, it is possible to impart the particles with a characteristics such as the density of the particles and with a functionality such as the surface modification for the formation of the thrombus, iodine complex forming ability and the like by varying the reaction conditions.

DESCRIPTION OF THE PREFERRED EMBODIMENTS

The specific and comparative examples are illustrated below. However, the examples are presented only for illustrative purposes and should not be construed as limiting the invention.

EXAMPLE 1

Figure 2:
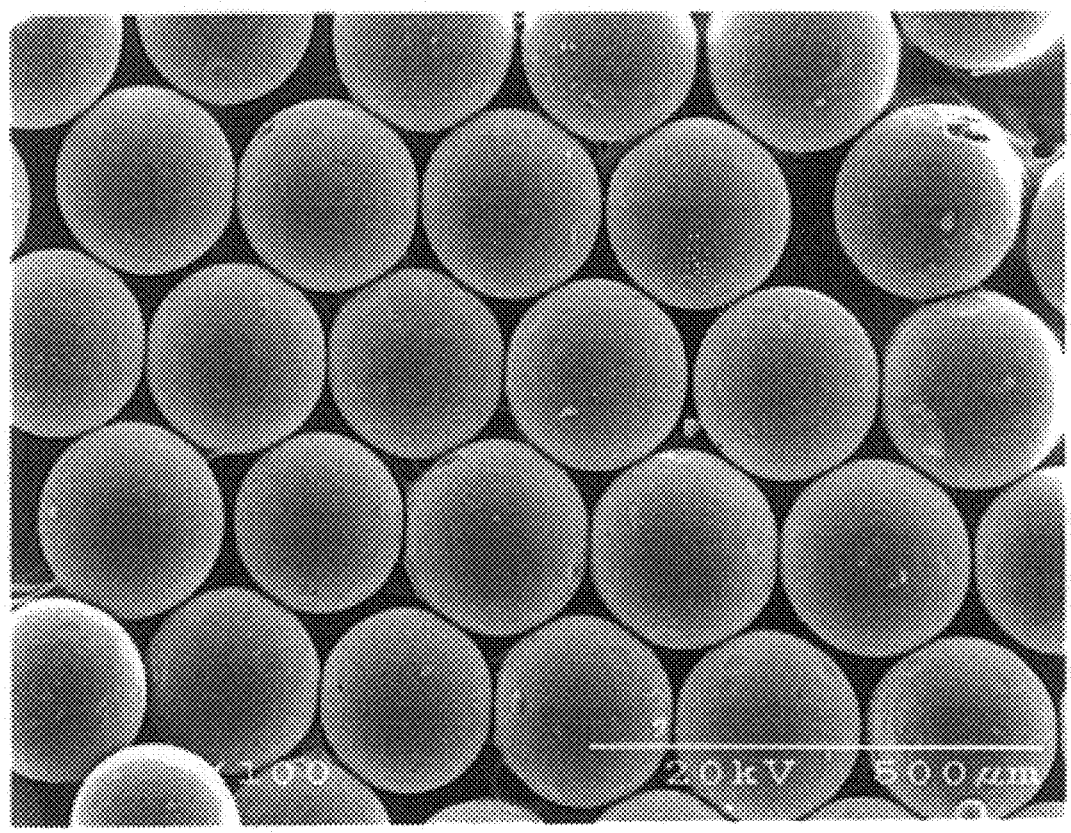
FIG. 2 is a scanned electron micrograph of poly(vinyl acetate) (PVAc) particles (particle size 150–180 µm) separated by the use of sodium chloride as a dispersing and antistatic agent according to Example 1.

1.0 g of the poly(vinyl acetate) (PVAC) particles (particle size: 50–1000 μm, polydispersity index of particle size: 1.80, number mean degree of polymerization: 14,500, and branching degree: 4.3), which have been prepared by suspension polymerization, were milled in mortar and pestle by using 0.5 g of sodium chloride as a dispersing and antistatic agent and then separated by the use of the standard sieves. The separated particles were stirred by a magnetic stirrer in a 250-ml beaker, washed with 100 ml of the distilled water for 4 hours and filtrated with a glass filter. After being dried under a vacuum at 40° C. for one day, PVAc particles having various particle sizes were obtained. FIG. 2 shows the scanned electron micrograph of the resulting PVAc particles. The separated particles had select particle sizes of 50–70 μm, 70–90 μm, 90–100 μm, 100–120 μm, 120–150 μm, 150–180 μm, 180–200 μm, 200–220 μm, 220–250 μm, 250–300 μm, 300–350 μm, 350–400 μm, 400–450 μm, 450–500 μm, 500–600 μm, 600–700 μm, 700–800 μm, 800–900 μm and 900–1,000 μm, and a polydispersity index of 1.04–1.06.

The "polydispersity index of particle size" is defined by dividing a weight mean particle diameter with a number mean particle diameter for 500 particles, wherein the weight mean particle diameter and the number mean particle diameter are measured using a particle size analyzer (Bips 3.0, Biomedilab). If the polydispersity index of the particle size is within 1.0–1.2, it is known that these particles may be referred to as monodispersed.

The "degree of polymerization" of the PVAc is obtained by dissolving PVAc into benzene and measuring the viscosity. The "degree of branching" is a value of the number mean degree of polymerization of PVAc divided with that of PVA that was prepared by saponification of said PVAc (See Won Seok Lyoo and Wan Shik Ha, J. Polym. Sci.: Polym. Chem. Edn, 35, 55, 1997).

EXAMPLE 2

1.0 g of the PVAc particles (particle size: 50–1000 μm, polydispersity index of particle size: 1.80, number mean degree of polymerization: 14,500, and branching degree: 4.3), which have been prepared by suspension polymerization, were milled in mortar and pestle by using 0.5 g of magnesium sulfate as a dispersing and antistatic agent and then separated by the use of the standard sieves. The separated particles were stirred by a magnetic stirrer in a 250-ml beaker, washed with 100 ml of the distilled water for 4 hours and filtrated with a glass filter. After being dried under a vacuum at 40° C. for one day, PVAc particles having various particle sizes were obtained. The separated particles had select particle sizes of 50–70 μm, 70–90 μm, 90–100 μm, 100–120 μm, 120–150 μm, 150–180 μm, 180–200 μm, 200–220 μm, 220–250 μm, 250–300 μm, 300–350 μm, 350–400 μm, 400–450 μm, 450–500 μm, 500–600 μm, 600–700 μm, 700–800 μm, 800–900 μm and 900–1,000 μm, and a polydispersity index of 1.05–1.08.

EXAMPLE 3

1.0 g of the PVAc particles (particle size: 50–1000 μm, polydispersity index of particle size: 1.80, number mean degree of polymerization: 14,500, and branching degree: 4.3), which have been prepared by suspension polymerization, were milled in mortar and pestle by using 0.5 g of calcium sulfate as a dispersing and antistatic agent and then separated by the use of the standard sieves. The separated particles were stirred by a magnetic stirrer in a 250-ml beaker, washed with 100 ml of the distilled water for 4 hours and filtrated with a glass filter. After being dried under a vacuum at 40° C. for one day, PVAc particles having various particle sizes were obtained. The separated particles had select particle sizes of 50–70 μm, 70–90 μm, 90–100 μm, 100–120 μm, 120–150 μm, 150–180 μm, 180–200 μm, 200–220 μm, 220–250 μm, 250–300 μm, 300–350 μm, 350–400 μm, 400–450 μm, 450–500 μm, 500–600 μm, 600–700 μm, 700–800 μm, 800–900 μm and 900–1,000 μm, and a polydispersity index of 1.04–1.07.

EXAMPLE 4

1.0 g of the PVAc particles (particle size: 50–1000 μm, polydispersity index of particle size: 1.80, number mean degree of polymerization: 14,500, and branching degree: 4.3), which have been prepared by suspension polymerization, were milled in mortar and pestle by using 0.5 g of sodium sulfate as a dispersing and antistatic agent and then separated by the use of the standard sieves. The separated particles were stirred by a magnetic stirrer in a 250-ml beaker, washed with 100 ml of the distilled water for 4 hours and filtrated with a glass filter. After being dried under a vacuum at 40° C. for one day, PVAc particles having various particle sizes were obtained. The separated particles had select particle sizes of 50–70 μm, 70–90 μm, 90–100 μm, 100–120 μm, 120–150 μm, 150–180 μm, 180–200 μm, 200–220 μm, 220–250 μm, 250–300 μm, 300–350 μm, 350–400 μm, 400–450 μm, 450–500 μm, 500–600 μm, 600–700 μm, 700–800 μm, 800–900 μm and 900–1,000 μm, and a polydispersity index of 1.03–1.06.

EXAMPLE 5

1.0 g of the PVAc particles (particle size: 50–1000 μm, polydispersity index of particle size: 1.80, number mean degree of polymerization: 14,500, and branching degree: 4.3), which have been prepared by suspension polymerization, were milled in mortar and pestle by using 0.5 g of sodium sulfite as a dispersing and antistatic agent and then separated by the use of the standard sieves. The separated particles were stirred by a magnetic stirrer in a 250-ml beaker, washed with 100 ml of the distilled water for 4 hours and filtrated with a glass filter. After being dried under a vacuum at 40° C. for one day, PVAc particles having various particle sizes were obtained. The separated particles had select particle sizes of 50–70 μm, 70–90 μm, 90–100 μm, 100–120 μm, 120–150 μm, 150–180 μm, 180–200 μm, 200–220 μm, 220–250 μm, 250–300 μm, 300–350 μm, 350–400 μm, 400–450 μm, 450–500 μm, 500–600 μm, 600–700 μm, 700–800 μm, 800–900 μm and 900–1,000 μm, and a polydispersity index of 1.01–1.02.

EXAMPLE 6

1.0 g of the PVAc particles (particle size: 50–1000 μm, polydispersity index of particle size: 1.80, number mean degree of polymerization: 14,500, and branching degree: 4.3), which have been prepared by suspension polymerization, were milled in mortar and pestle by using 50 g of sodium chloride as a dispersing and antistatic agent and then separated by the use of the standard sieves. The separated particles were stirred by a magnetic stirrer in a 250-ml beaker, washed with 100 ml of the distilled water for 4 hours and filtrated with a glass filter. After being dried under a vacuum at 40° C. for one day, PVAc particles having various particle sizes were obtained. The separated particles had select particle sizes of 50–70 μm, 70–90 μm, 90–100 μm, 100–120 μm, 120–150 μm, 150–180 μm, 180–200 μm, 200–220 μm, 220–250 μm, 250–300 μm, 300–350 μm, 350–400 μm, 400–450 μm, 450–500 μm, 500–600 μm, 600–700 μm, 700–800 μm, 800–900 μm and 900–1,000 μm, and a polydispersity index of 1.04–1.06.

EXAMPLE 7

1.0 g of the PVAc particles particle size: 50–1000 μm, polydispersity index of particle size: 1.80, number mean degree of polymerization: 14,500, and branching degree: 4.3), which have been prepared by suspension polymerization, were milled in mortar and pestle by using 100 g of sodium chloride as a dispersing and antistatic agent and then separated by the use of the standard sieves. The separated particles were stirred by a magnetic stirrer in a 250-ml beaker, washed with 100 ml of the distilled water for 4 hours and filtrated with a glass filter. After being dried under a vacuum at 40° C. for one day, PVAc particles having various particle sizes were obtained. The separated particles had select particle sizes of 50–70 μm, 70–90 μm, 90–100 μm, 100–120 μm, 120–150 μm, 150–180 μm, 180–200 μm, 200–220 μm, 220–250 μm, 250–300 μm, 300–350 μm, 350–400 μm, 400–450 μm, 450–500 μm, 500–600 μm, 600–700 μm, 700–800 μm, 800–900 μm and 900–1,000 μm, and a polydispersity index of 1.04–1.06.

EXAMPLE 8

In a 250 ml two-neck flask equipped with a thermometer and a cooling column, 100 ml of aqueous alkali solution comprising 8.75 g of sodium hydroxide, 8.75 g of sodium sulfate and 8 g of methanol was charged. To this solution, 0.5 g of PVAc particles (particles size: 90–100 μm, polydispersity index: 1.03 and number mean degree of polymerization: 8,300), which have been separated by the use of sodium sulfate as a dispersing and antistatic agent, were suspended and then were saponified at 40° C. for 4 hours with stirring by using a magnetic stirrer. After the reaction was completed, reactions were poured on the chilled distilled water, stirred for 1 hour and filtered with a glass filter. Filtrates were washed with an excess of the distilled water and filtered. This process was repeated three times. After being dried under a vacuum at 40° C. for one day, spherical particles having a dual structure of PVAc core and PVA shell, in which the surface of the PVAc particles were converted to PVA with 38.5% saponification, a particle size of 87–95 μm and a polydispersity index of 1.03 were obtained.

EXAMPLE 9

In a 250 ml two-neck flask equipped with a thermometer and a cooling column, 100 ml of aqueous alkali solution comprising 8.75 g of sodium hydroxide, 8.75 g of sodium sulfate and 8 g of methanol was charged. To this solution, 0.5 g of PVAc particles (particles size: 200–220 μm, polydispersity index: 1.01 and number mean degree of polymerization: 8,300), which have been separated by the use of sodium sulfate as a dispersing and antistatic agent, were suspended and then were saponified at 40° C. for 4 hours with stirring by using a magnetic stirrer. After the reaction was completed, reactions were poured on the chilled distilled water, stirred for 1 hour and filtered with a glass filter. Filtrates were washed with an excess of the distilled water and filtered. This process was repeated three times. After being dried under a vacuum at 40° C. for one day, spherical particles having a dual structure of PVAc core and PVA shell, in which the surface of the PVAc particles were converted to PVA with 14.7% saponification, a particle size of 200–220 μm and a polydispersity index of 1.01 were obtained.

Figure 3:
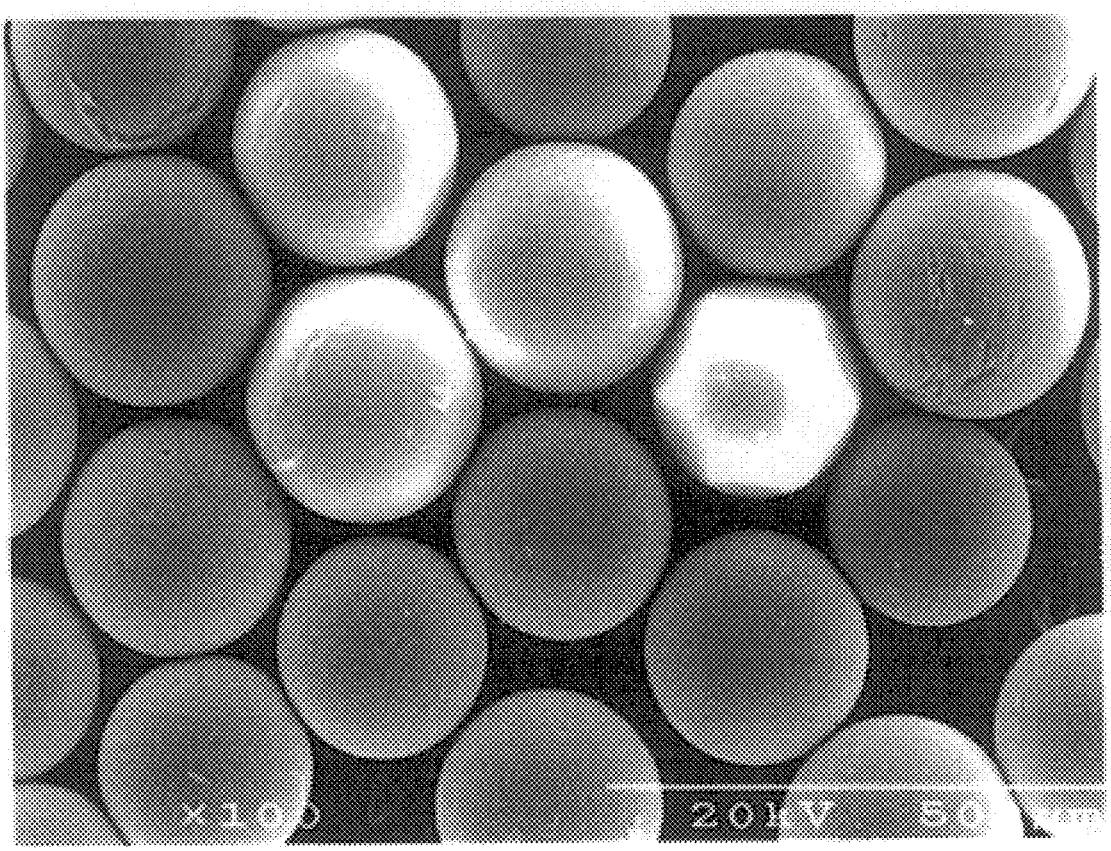
FIG. 3 is a scanned electron micrograph of microspheric embolic particles of a dual structure consisting of PVAc core and PVA shell prepared by heterogeneous surface saponification of PVAc particles (particle size 200–220 µm) according to Example 9.

FIG. 3 shows the scanned electron micrograph of the resulting spherical particles.

EXAMPLE 10

In a 250 ml two-neck flask equipped with a thermometer and a cooling column, 100 ml of aqueous alkali solution comprising 8.75 g of sodium hydroxide, 8.75 g of sodium sulfate and 8 g of methanol was charged. To this solution, 0.5 g of PVAc particles (particles size: 410–430 μm, polydispersity index: 1.02 and number mean degree of polymerization: 18,700), which have been separated by the use of sodium sulfate as a dispersing and antistatic agent, were suspended and then were saponified at 40° C. for 4 hours with stirring by using a magnetic stirrer. After the reaction was completed, reactions were poured on the chilled distilled water, stirred for 1 hour and filtered with a glass filter. Filtrates were washed with an excess of the distilled water and filtered. This process was repeated three times. After being dried under a vacuum at 40° C. for one day, spherical particles having a dual structure of PVAc core and PVA shell, in which the surface of the PVAc particles were converted to PVA with 12.7% saponification, a particle size of 410–430 μm and a polydispersity index of 1.02 were obtained.

EXAMPLE 11

In a 250 ml two-neck flask equipped with a thermometer and a cooling column, 100 ml of aqueous alkali solution comprising 8.75 g of sodium hydroxide, 8.75 g of sodium sulfate and 8 g of methanol was charged. To this solution, 0.5 g of PVAc particles (particles size: 300–350 μm, polydispersity index: 1.10 and number mean degree of polymerization: 16,200), which have been separated by the use of sodium sulfate as a dispersing and antistatic agent, were suspended and then were saponified at 40° C. for 4 hours with stirring by using a magnetic stirrer. After the reaction was completed, reactions were poured on the chilled distilled water, stirred for 1 hour and filtered with a glass filter. Filtrates were washed with an excess of the distilled water and filtered. This process was repeated three times. After being dried under a vacuum at 40° C. for one day, spherical particles having a dual structure of PVAc core and PVA shell, in which the surface of the PVAc particles were converted to PVA with 25.4% saponification, a particle size of 290–340 μm and a polydispersity index of 1.01 were obtained.

EXAMPLE 12

In a 250 ml two-neck flask equipped with a thermometer and a cooling column, 100 ml of aqueous alkali solution comprising 8.75 g of sodium hydroxide, 8.75 g of sodium sulfate and 8 g of methanol was charged. To this solution, 0.5 g of PVAc particles (particles size: 100–120 torn, polydispersity index: 1.03 and number mean degree of polymerization: 9,100), which have been separated by the use of sodium sulfate as a dispersing and antistatic agent, were suspended and then were saponified at 40° C. for 4 hours with stirring by using a magnetic stirrer. After the reaction was completed, reactions were poured on the chilled distilled water, stirred for 1 hour and filtered with a glass filter. Filtrates were washed with an excess of the distilled water and filtered. This process was repeated three times. After being dried under a vacuum at 40° C. for one day, spherical particles having a dual structure of PVAc core and PVA shell, in which the surface of the PVAc particles were converted to PVA with 41.7% saponification, a particle size of 85–100 μm and a polydispersity index of 1.03 were obtained.

EXAMPLE 13

In a 250 ml two-neck flask equipped with a thermometer and a cooling column, 100 ml of aqueous alkali solution comprising 8.75 g of sodium hydroxide, 8.75 g of sodium sulfate and 8 g of methanol was charged. To this solution, 0.5 g of PVAc particles (particles size: 120–150 μm, polydispersity index: 1.03 and number mean degree of polymerization: 9,100), which have been separated by the use of sodium sulfate as a dispersing and antistatic agent, were suspended and then were saponified at 40° C. for 4 hours with stirring by using a magnetic stirrer. After the reaction was completed, reactions were poured on the chilled distilled water, stirred for 1 hour and filtered with a glass filter. Filtrates were washed with an excess of the distilled water and filtered. This process was repeated three times. After being dried under a vacuum at 40° C. for one day, spherical particles having a dual structure of PVAc core and PVA shell, in which the surface of the PVAc particles were converted to PVA with 35.2% saponification, a particle size of 115–145 μm and a polydispersity index of 1.03 were obtained.

EXAMPLE 14

In a 250 ml two-neck flask equipped with a thermometer and a cooling column, 100 ml of aqueous alkali solution comprising 8.75 g of sodium hydroxide, 8.75 g of sodium sulfite and 8 g of methanol was charged. To this solution, 0.5 g of PVAc particles (particles size: 150–200 μm, polydispersity index: 1.03 and number mean degree of polymerization: 10,800), which have been separated by the use of sodium sulfite as a dispersing and antistatic agent, were suspended and then were saponified at 40° C. for 4 hours with stirring by using a magnetic stirrer. After the reaction was completed, reactions were poured on the chilled distilled water, stirred for 1 hour and filtered with a glass filter. Filtrates were washed with an excess of the distilled water and filtered. This process was repeated three times. After being dried under a vacuum at 40° C. for one day, spherical particles having a dual structure of PVAc core and PVA shell, in which the surface of the PVAc particles were converted to PVA with 30.0% saponification, a particle size of 147–200 μm and a polydispersity index of 1.03 were obtained.

EXAMPLE 15

In a 250 ml two-neck flask equipped with a thermometer and a cooling column, 100 ml of aqueous alkali solution comprising 8.75 g of sodium hydroxide, 8.75 g of sodium sulfite and 8 g of methanol was charged. To this solution, 0.5 g of PVAc particles (particles size: 150–180 μm, polydispersity index: 1.02 and number mean degree of polymerization: 8,600), which have been separated by the use of sodium sulfite as a dispersing and antistatic agent, were suspended and then were saponified at 40° C. for 1 hour with stirring by using a magnetic stirrer. After the reaction was completed, reactions were poured on the chilled distilled water, stirred for 1 hour and filtered with a glass filter. Filtrates were washed with an excess of the distilled water and filtered. This process was repeated three times. After being dried under a vacuum at 40° C. for one day, spherical particles having a dual structure of PVAc core and PVA shell, in which the surface of the PVAc particles were converted to PVA with 11.7% saponification, a particle size of 150–180 μm and a polydispersity index of 1.02 were obtained.

EXAMPLE 16

In a 250 ml two-neck flask equipped with a thermometer and a cooling column, 100 ml of aqueous alkali solution comprising 8.75 g of sodium hydroxide, 8.75 g of sodium sulfite and 8 g of methanol was charged. To this solution, 0.5 g of PVAc particles (particles size: 53–90 μm, polydispersity index: 1.10 and number mean degree of polymerization: 8,600), which have been separated by the use of sodium sulfite as a dispersing and antistatic agent, were suspended and then were saponified at 40° C. for 1 hour with stirring by using a magnetic stirrer. After the reaction was completed, reactions were poured on the chilled distilled water, stirred for 1 hour and filtered with a glass filter. Filtrates were washed with an excess of the distilled water and filtered. This process was repeated three times. After being dried under a vacuum at 40° C. for one day, spherical particles having a dual structure of PVAc core and PVA shell, in which the surface of the PVAc particles were converted to PVA with 31.4% saponification, a particle size of 50–90 μm and a polydispersity index of 1.10 were obtained.

EXAMPLE 17

In a 250 ml two-neck flask equipped with a thermometer and a cooling column, 100 ml of aqueous alkali solution comprising 8.75 g of sodium hydroxide, 8.75 g of sodium sulfite and 8 g of methanol was charged. To this solution, 0.5 g of PVAc particles (particles size: 53–75 μm, polydispersity index: 1.06 and number mean degree of polymerization: 8,600), which have been separated by the use of sodium sulfite as a dispersing and antistatic agent, were suspended and then were saponified at 40° C. for 2 hours with stirring by using a magnetic stirrer. After the reaction was completed, reactions were poured on the chilled distilled water, stirred for 1 hour and filtered with a glass filter. Filtrates were washed with an excess of the distilled water and filtered. This process was repeated three times. After being dried under a vacuum at 40° C. for one day, spherical particles having a dual structure of PVAc core and PVA shell, in which the surface of the PVAc particles were converted to PVA with 11.3% saponification, a particle size of 52–74 μm and a polydispersity index of 1.06 were obtained.

EXAMPLE 18

In a 250 ml two-neck flask equipped with a thermometer and a cooling column, 100 ml of aqueous alkali solution comprising 8.75 g of sodium hydroxide, 8.75 g of sodium sulfite and 8 g of methanol was charged. To this solution, 0.5 g of PVAc particles (particles size: 75–90 μm, polydispersity index: 1.03 and number mean degree of polymerization: 8,600), which have been separated by the use of sodium sulfite as a dispersing and antistatic agent, were suspended and then were saponified at 40° C. for 2.5 hours with stirring by using a magnetic stirrer. After the reaction was completed, reactions were poured on the chilled distilled water, stirred for 1 hour and filtered with a glass filter. Filtrates were washed with an excess of the distilled water and filtered. This process was repeated three times. After being dried under a vacuum at 40° C. for one day, spherical particles having a dual structure of PVAc core and PVA shell, in which the surface of the PVAc particles were converted to PVA with 24.1% saponification, a particle size of 50–70 μm and a polydispersity index of 1.03 were obtained.

EXAMPLE 19

In a 250 ml two-neck flask equipped with a thermometer and a cooling column, 100 ml of aqueous alkali solution comprising 8.75 g of sodium hydroxide, 8.75 g of sodium sulfite and 8 g of methanol was charged. To this solution, 0.5 g of PVAc particles (particles size: 180–200 μm, polydispersity index: 1.01 and number mean degree of polymerization: 8,600), which have been separated by the use of sodium sulfite as a dispersing and antistatic agent, were suspended and then were saponified at 40° C. for 3 hours with stirring by using a magnetic stirrer. After the reaction was completed, reactions were poured on the chilled distilled water, stirred for 1 hour and filtered with a glass filter. Filtrates were washed with an excess of the distilled water and filtered. This process was repeated three times. After being dried under a vacuum at 40° C. for one day, spherical particles having a dual structure of PVAc core and PVA shell, in which the surface of the PVAc particles were converted to PVA with 88.1% saponification, a particle size of 175–195 μm and a polydispersity index of 1.01 were obtained.

EXAMPLE 20

In a 250 ml two-neck flask equipped with a thermometer and a cooling column, 100 ml of aqueous alkali solution comprising 8.75 g of sodium hydroxide, 8.75 g of sodium sulfite and 8 g of methanol was charged. To this solution, 0.5 g of PVAc particles (particles size: 210–230 μm, polydispersity index: 1.01 and number mean degree of polymerization: 8,600), which have been separated by the use of sodium sulfite as a dispersing and antistatic agent, were suspended and then were saponified at 40° C. for 4 hours with stirring by using a magnetic stirrer. After the reaction was completed, reactions were poured on the chilled distilled water, stirred for 1 hour and filtered with a glass filter. Filtrates were washed with an excess of the distilled water and filtered. This process was repeated three times. After being dried under a vacuum at 40° C. for one day, spherical particles having a dual structure of PVAc core and PVA shell, in which the surface of the PVAc particles were converted to PVA with 92.9% saponification, a particle size of 200–220 μm and a polydispersity index of 1.01 were obtained.

EXAMPLE 21

In a 250 ml two-neck flask equipped with a thermometer and a cooling column, 200 ml of aqueous alkali solution comprising 43.75 g of sodium hydroxide, 43.75 g of sodium sulfate and 40 g of methanol was charged. To this solution, 0.5 g of PVAc particles (particles size: 210–220 μm, polydispersity index: 1.01 and number mean degree of polymerization: 8,300), which have been separated by the use of sodium sulfate as a dispersing and antistatic agent, were suspended and then were saponified at 30° C. for 8 hours with stirring by using a magnetic stirrer. After the reaction was completed, reactions were poured on the chilled distilled water, stirred for 1 hour and filtered with a glass filter. Filtrates were washed with an excess of the distilled water and filtered. This process was repeated three times. After being dried under a vacuum at 40° C. for one day, spherical particles having a dual structure of PVAc core and PVA shell, in which the surface of the PVAc particles were converted to PVA with 93.3% saponification, a particle size of 190–210 μm and a polydispersity index of 1.05 were obtained.

EXAMPLE 22

In a 250 ml two-neck flask equipped with a thermometer and a cooling column, 200 ml of aqueous alkali solution comprising 43.75 g of sodium hydroxide, 43.75 g of sodium sulfate and 40 g of methanol was charged. To this solution, 0.5 g of PVAc particles (particles size: 210–220 μm, polydispersity index: 1.01 and number mean degree of polymerization: 8,300), which have been separated by the use of sodium sulfate as a dispersing and antistatic agent, were suspended and then were saponified at 5° C. for 24 hours with stirring by using a magnetic stirrer. After the reaction was completed, reactions were poured on the chilled distilled water, stirred for 1 hour and filtered with a glass filter. Filtrates were washed with an excess of the distilled water and filtered. This process was repeated three times. After being dried under a vacuum at 40° C. for one day, spherical particles having a dual structure of PVAc core and PVA shell, in which the surface of the PVAc particles were converted to PVA with 6.9% saponification, a particle size of 210–220 μm and a polydispersity index of 1.01 were obtained.

COMPARATIVE EXAMPLE 1

In a 200 ml two-neck flask equipped with a thermometer and a cooling column, 2 g of PVAc particles prepared by suspension polymerization were dissolved in 100 ml of methanol, to which 2.5 ml of 40% aqueous sodium hydroxide solution was dropped and stirred at ambient temperature for 5 hours. Then, the resulting product was filtered and washed with methanol thoroughly to remove sodium acetate. After being dried under a vacuum at 50° C., PVAs with 99.9% saponification were obtained. The resulting PVAs were milled with mortar and pestle. Then, the PVAs were separated by the use of standard sieves to give PVA particles of 50–70 μm, 70–90 μm, 90–100 μm, 100–120 μm, 120–150 μm, 150–180 μm, 180–200 μm, 200–220 μm, 220–250 μm, 250–300 μm, 300–350 μm, 350–400 μm, 400–450 μm, 450–500 μm, 500–600 μm, 600–700 μm, 700–800 μm, 800–900 μm and 900–1,000 μm. The surface of the prepared PVA particles was very rough and irregular in shape.

What is claimed is:

1. A method for separating poly(vinyl acetate) particles having various particle sizes, which have been prepared by suspension polymerization of vinyl acetate monomers, into individual microspheric poly(vinyl acetate) particles having a uniform particle size distribution and a polydispersity index of particle sizes of about 1.00–1.60, which comprises the steps of:

(a) adding to said poly(vinyl acetate) particles having various particle sizes inorganic salt as a dispersing and antistatic agent in the amount of about 0.1–100 parts by weight per part by weight of associates of said poly (vinyl acetate) particles having various particle sizes;

(b) milling said associates of poly(vinyl acetate) particles; and (c) separating said milled associates of poly(vinyl acetate) particles with standard sieves to individual particles having select particle sizes of 50–70 μm, 70–90 μm, 90–100 μm, 100–120 μm, 120–150 μm, 150–180 μm, 180–200 μm, 200–220 μm, 220–250 μm, 250–300 μm, 300–350 μm, 350–400 μm, 400–450 μm, 450–500 μm, 500–600 μm, 600–700 μm, 700–800 μm, 800–900 μm and 900–1,000 μm.

2. The method according to claim 1 wherein said inorganic salt is selected from the group consisting of sodium sulfate, sodium sulfite, sodium chloride, calcium sulfate and magnesium sulfate.

3. Microspheric embolic material particles of a dual structure consisting of poly(vinyl acetate) core/poly(vinyl alcohol) shell, having select particle sizes of 50–70 μm, 70–90 µm, 90–100 µm, 100–120 µm, 120–150 µm, 150–180 µm, 180–200 µm, 200–220 µm, 220–250 µm, 250–300 µm, 300–350 µm, 350–400 µm, 400–450 µm, 450–500 µm, 500–600 µm, 600–700 µm, 700–800 µm, 800–900 µm and 900–1,000 µm, and a polydispersity index of particle sizes of about 1.00–1.20, wherein the saponification degree of said poly(vinyl acetate) is about 1–99.9%, and the ratio of the inner radius of poly(vinyl acetate) core to the outer radius of poly(vinyl alcohol) shell is about 0.01–0.99.

4. A method for preparing microspheric embolic material particles of a dual structure consisting of poly(vinyl acetate) core/poly(vinyl alcohol) shell as defined in claim 3, which comprises the steps of:

suspending the microspheric poly(vinyl acetate) particles separated by the method according to claim 1 into an aqueous alkali solution, and subjecting the suspended particles to a heterogeneous surface saponification at a temperature of 0° C. to 90° C. so that only the surface of said poly(vinyl acetate) particles is saponified.

5. The method according to claim 4 wherein said aqueous alkali solution is an aqueous solution comprising sodium hydroxide, sodium sulfate or sodium sulfite and methanol.

* * * * *